(No Model.)
G. GEDDES.
ROAD CART.
No. 396,475.   Patented Jan. 22, 1889.
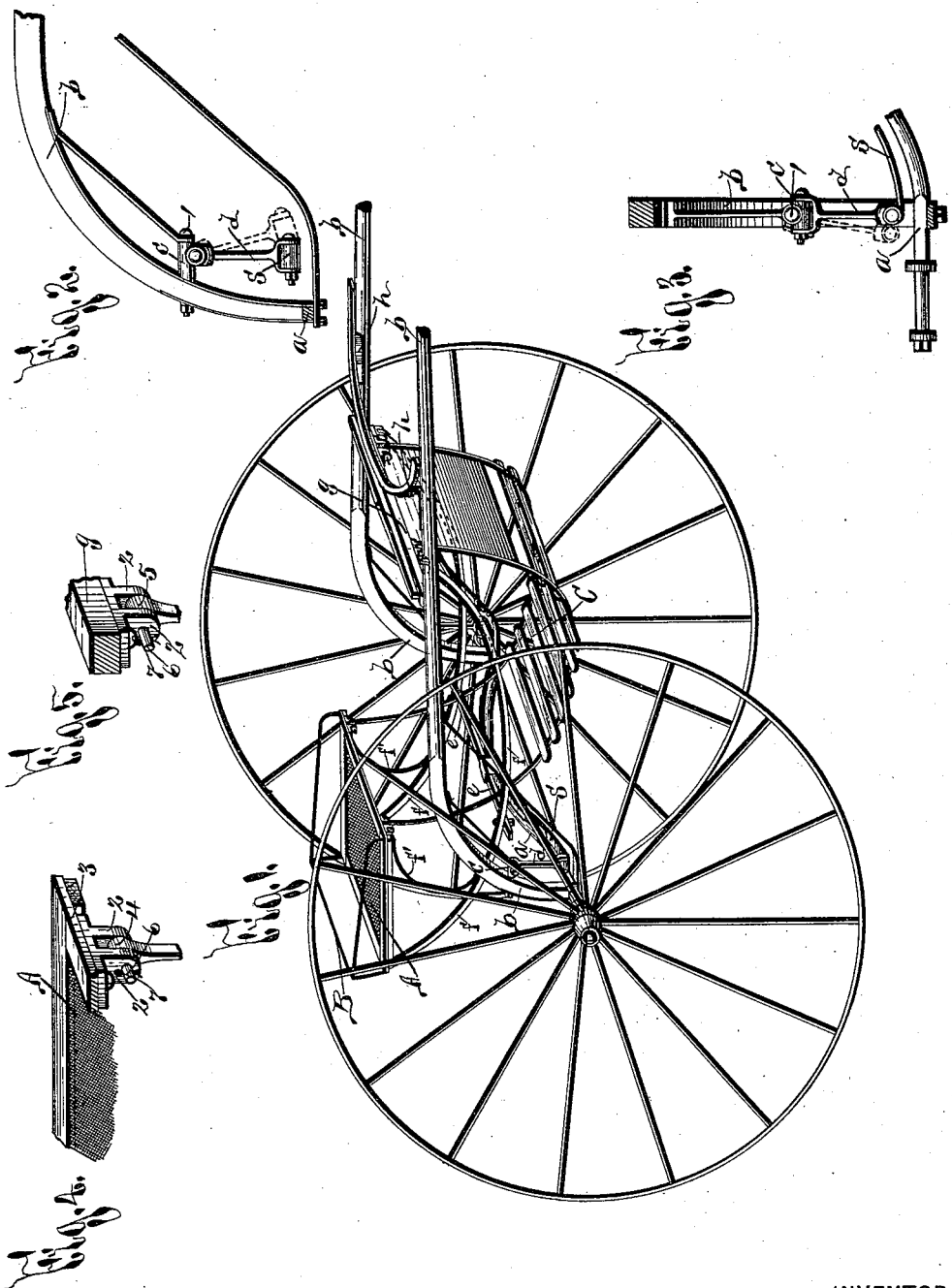
WITNESSES:
INVENTOR
George Geddes
BY
ATTORNEYS

UNITED STATES PATENT OFFICE.

GEORGE GEDDES, OF FAIRMOUNT, NEW YORK.

ROAD-CART.

SPECIFICATION forming part of Letters Patent No. 396,475, dated January 22, 1889.

Application filed July 30, 1888. Serial No. 281,426. (No model.)

*To all whom it may concern:*

Be it known that I, GEORGE GEDDES, of Fairmount, in the county of Onondaga, in the State of New York, have invented new and useful Improvements in Carts, of which the following, taken in connection with the accompanying drawings, is a full, clear, and exact description.

My invention relates to improvements in the class of vehicles termed "exercising-carts," and has for its object the production of a simple and strong cart which may be used for run-about purposes and readily adapted for use as a speeding cart or sulky; and to this end my invention consists, essentially, in the detail construction and arrangement of the parts, all as hereinafter more fully described, and pointed out in the claims.

In specifying my invention reference is had to the accompanying drawings, forming a part thereof, like letters indicating corresponding parts in all the views.

Figure 1 is a perspective view of my improved cart, illustrating the general construction and arrangement of the novel parts. Fig. 2 is an enlarged detached view, partly in section, of the shafts, stirrups, and shackle-joint, illustrating the manner of connecting the springs to the shaft. Fig. 3 is an enlarged detached detail view, partly in section, of the parts shown in Fig. 2, taken from the front thereof, the full lines illustrating the normal position of the spring-attaching stirrup, and the dotted lines showing the deflection or the rocking of the stirrup on the pivoted shackle. Fig. 4 is an enlarged detached view illustrating the connection of the foot-rest to the seat; and Fig. 5 is an enlarged detached view, partly in section, of the forward connection of the foot-rest to the cross-bar on the shafts.

$a$ is the axle of my improved cart, which is preferably arched, as best shown in Fig. 1 of the drawings, to which are clipped the shafts $b$ at or near its extremities. The shafts $b$ are curved, as best shown in Figs. 1 and 2, and are provided with the shackles $c$, which project horizontally from the shafts, and are secured thereto by suitable bolts, $l$, the said bolts forming pivots upon which the shackles $c$ rock. The shackles $c$ are connected to stirrups $d$, depending therefrom and carrying the springs S. It will be observed that the stirrups $d$ and the pivoted shackles are arranged oppositely to each other on the two shafts, so as to carry opposite ends of the semi-elliptic spring S, and that owing to the pivoted connection of the spring S to the shaft by means of the shackle $c$ and the stirrup $d$ the spring is allowed a rocking movement transversely of the cart on the said connection. It will also be observed upon reference to Fig. 3 that the shackle $c$, secured to the shaft on the bolt $l$, is permitted to rock in the opposite direction, thereby giving the spring S a longitudinal movement on the stirrup $d$, as well as the transverse rock on the shackle $c$.

The spring S carries the bolster $e$, which is securely clipped thereto, and the bolster $e$ serves to support the seat by means of the curved seat-supports $f f$, Fig. 1, the said seat-supports being securely bolted to the opposite ends of the bolster $e$. A bracket, $f'$, secured to the curved seat-support $f$, serves to sustain the inner edge of the seat A, and the seat A may be provided with the usual seat-rail, B, of any suitable form or design.

It will be observed that the seat A is secured to the spring S through the medium of the bolster and the seat-supports $f f'$, and that the movement of the seat necessarily follows the movement of the spring S on its pivoted connections, and that the horse motion ordinarily present in exercising-carts is entirely overcome and prevented in the described construction.

C is the foot-support, which I detachably connect to the cross-bar $g$ at its forward end and to the seat-sill at its rear end, as best shown in Figs. 1, 4, and 5. It will be observed upon reference to Figs. 4 and 5 that lugs 2 2, depending, respectively, from the sill 3 of the seat and from the cross-bar $g$ of the shafts, receive the extremities 4 5 of the rail of the foot-rest, and that the said rail is secured in the said lugs by means of a bolt, 6, which is passed through the lugs and through an eye formed in the extremities of the rail, and a cotter-key or leather pin, 7, serves to confine the bolt in its place, and at the same time allows the ready removal of the bolt from the lugs when it is desired to remove the foot-rest C from the cart.

The object of detachably connecting the foot-rest to the seat and cross-bar in the manner described is, as stated, to permit the cart to be transformed into a speeding cart or sulky, and it will be apparent that by removing the foot-rest C and providing suitable stirrups, $h$, secured to the shaft and cross-bar, as best shown in Fig. 1, the change can be readily effected.

It will be understood that when the cart is used as a speeding-sulky it is desirable to strap the spring S to the axle $a$, and this can be accomplished by providing a metal strap or leather strap and securing the spring and axle in any suitable manner. The chief feature of advantage, however, of my improved cart consists in overcoming the horse motion incidental to this class of vehicles, which I accomplish by the peculiar connection of the spring to the shafts by means of the compound shackle-joint and stirrups heretofore described. The different positions assumed by the stirrups are indicated by the full lines and dotted lines in Figs. 2 and 3.

It will be noticed that both a lateral and longitudinal movement is permitted, or, in other words, the spring supporting the seat is allowed to adjust itself by means of the compound pivots to the various positions assumed by the running-gear or tilting of the cart incidental to the movement of the horse, while the spring itself makes the cart ride very easy and comfortable.

The improved cart is simple in construction, very light, owing to the few parts employed in its construction, and at the same time is exceedingly strong and durable, and a very desirable "make shift" sulky is readily produced by removing the foot-rest C, as previously described, and utilizing the stirrup $h$ in its stead to support the feet.

Having thus fully described my invention, what I claim as new, and desire to secure by Letters Patent, is—

1. The combination of a shackle having journal-bearings arranged one above the other and at substantially right angles to each other, and a pivot-bolt, $l$, for securing the shackle to the cart, with a pendent stirrup, $d$, pivoted at one extremity to the said shackle at its other journal-bearing and secured to the end of the supporting-spring S, substantially as and for the purpose set forth.

2. The combination of the seat-supports hinged at their forward extremity to the frame of the cart, a transverse spring secured to the seat-supports, a shackle pivoted to the shafts, a stirrup pivoted at one extremity to the shackle, and the extremities of the spring pivoted to the opposite extremity of the pivoted stirrup, substantially as and for the purpose set forth.

3. The combination of the seat A, braces $f$, supporting the seat, pivoted at their forward extremity, and secured to a transverse cross-spring between their two extremities, with shafts secured to the axle, shackles pivoted to the shafts and rocking transversely of the cart, stirrups $d$, pivoted to the rocking shackle and rocking lengthwise of the cart, with a pivotal connection between the extremities of the transverse spring and the stirrups, substantially as and for the purpose set forth.

4. The combination, with a shackle having journal-bearings arranged one above the other and at substantially right angles to each other, and a pivot-bolt, $l$, for securing the shackle to the cart, a pendent stirrup, $d$, pivoted at one extremity to the said shackle at its other journal-bearing and secured to the end of the supporting-spring S, with a detachable foot-rest connected to the cart, and braces $h$, secured on the frame in suitable proximity to the foot when in position for speeding, substantially as and for the purpose set forth.

5. The combination of the seat A and cross-bar $g$, each provided with lugs 2, the rails 4 of the foot-rest provided with eyes fitting between the lugs 2, the bolts 6, for securing the rails to the lugs, and the pins 7, substantially as and for the purpose set forth.

In testimony whereof I have hereunto signed my name, in the presence of two attesting witnesses, at Syracuse, in the county of Onondaga, in the State of New York, this 25th day of July, 1888.

GEORGE GEDDES.

Witnesses:
M. BAXTER,
E. WEISBURG.